(12) United States Patent
Iwami et al.

(10) Patent No.: US 6,664,334 B2
(45) Date of Patent: Dec. 16, 2003

(54) GOLF BALL

(75) Inventors: Satoshi Iwami, Kobe (JP); Akira Kato, Kobe (JP); Keiji Moriyama, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 165 days.

(21) Appl. No.: 09/774,720

(22) Filed: Feb. 1, 2001

(65) Prior Publication Data

US 2001/0014632 A1 Aug. 16, 2001

(30) Foreign Application Priority Data

Feb. 2, 2000 (JP) ........................................ 2000-024986

(51) Int. Cl.⁷ .............................................. C08L 53/00
(52) U.S. Cl. ............................ 525/93; 525/94; 525/98; 525/99; 473/378; 473/385
(58) Field of Search ............................... 525/93, 94, 98, 525/99; 473/378, 385

(56) References Cited

U.S. PATENT DOCUMENTS 5,120,791 A 6/1992 Sullivan
5,716,293 A 2/1998 Yabuki et al.

FOREIGN PATENT DOCUMENTS

GB A23111530 1/1997

OTHER PUBLICATIONS

Daicel Chemical Industries, Lts. "Physical and Chemical Properties", http://www.daicel.co.jp/epfd/english/butuse/page/butu0, Jan. 28, 2003.*

* cited by examiner

Primary Examiner—James J. Seidleck
Assistant Examiner—Melanie Bissett
(74) Attorney, Agent, or Firm—Birch, Stewart, Kolasch & Birch, LLP

(57) ABSTRACT

A golf ball maintaining favorable shot feeling, exhibiting great spin rate when hit by a short iron or the like, and that easily comes to a halt, and with high spin maintenance is provided. In a golf ball including a core and a cover surrounding the core, the cover includes an ionomer resin (A component), a thermoplastic elastomer with a rubber component or a modified product thereof (B component), and a resin (C component) having solubility with the thermoplastic elastomer with a rubber segment or a modified product thereof. The mixed ratio of the A component/B component is 0.25–4, and the C component/B component is 0.1–0.9.

5 Claims, No Drawings

GOLF BALL

BACKGROUND OF THE INVENTION

1. Field of the Invention

The present invention relates to a golf ball that exhibits great flight distance with favorable shot feeling and that easily comes to a halt even though exhibiting high spin rate when shot from the rough or when shot in a raining condition.

2. Description of the Background Art

Conventional golf balls formed with a thread-wound layer around a liquid center and surrounded by a balata cover are widely used by low-handicapped golfers and professional golfers by virtue of its superior shot feeling and controllability. However, the structure of such golf balls has the disadvantage that the fabrication process is difficult and the cut resistance is inferior. Various soft cover materials are now proposed as a substitute for balata covers.

For example, U.S. Pat. No. 5,120,791 discloses the technique of mixing soft ionomer resins of ternary copolymer with the basic resin of the cover. However, the golf ball according to such technique was not satisfactory from the standpoint of spin maintenance since the spin rate in a wet condition was inferior to the spin rate in a dry condition.

Also, the basic resin of a cover disclosed in GB2311530 is formed having as the main component a heated mixture of two components, i.e. ionomer resin, and a styrene-butadiene-styrene block copolymer including a polybutadiene block containing an epoxy group or a styrene-isoprene-styrene block copolymer including a polyisoprene block containing an epoxy group. This publication proposes a golf ball characterized in that the cover composition forming the cover has a flexural modulus of 50–300 MPa and a Shore D hardness of 40–60. The technology provides superior shot feeling and controllability and also favorable flight performance and cut resistance. However, it was not directed to improve the spin maintenance.

U.S. Pat. No. 5,716,293 discloses a golf ball directed to improve the shot feeling and the spin rate when shot with a short iron by virtue of the usage of a solid rubber center including oily substance and a soft cover material.

However, the impact resilience and the shot feeling are not completely satisfactory since oil-resistant rubber or ionomer resin of high hardness is employed for the outer side of the solid rubber center.

SUMMARY OF THE INVENTION

In view of the foregoing problems of conventional golf balls, the object of the present invention is to provide a golf ball exhibiting soft and favorable shot feeling with a great flight distance, and that can easily come to a halt though the spin rate is great when shot from the rough or when shot in a raining condition.

According to an aspect of the present invention, a golf ball including a core and a cover surrounding the core has the cover constituted by the mixture of an ionomer resin (hereinafter A component), a thermoplastic elastomer with a rubber segment in its polymer unit or a modified product thereof (hereinafter B component), and a resin soluble with the thermoplastic elastomer or the modified product thereof (hereinafter C component). The mixed ratio of the A component and the B component (A component/B component) is in the range of 0.25–4.0. The mixed ratio of the C component to the B component (C component/B component) is in the range of 0.1–0.9.

According to another aspect of the present invention, the thermoplastic elastomer with a rubber segment in its polymer unit or a modified product thereof (B component) of a golfball includes a styrene-isoprene-butadiene-styrene block copolymer (SIBS structure), a styrene-butadiene-styrene block copolymer (SBS structure), a styrene-isoprene-styrene block copolymer (SIS structure), which includes a conjugated diene compound such as a butadiene block or isoprene block, or a modified product thereof modified by a functional group selected from a carboxyl group, epoxy group, hydroxy group and acid anhydride.

According to a further aspect of the present invention, the resin (C component) soluble with the B component of a golf ball includes terpene resin and/or rosin ester resin.

According to still another aspect of the present invention, the blended amount of the C component of a golf ball is 5–30 parts by weight with respect to the total 100 parts by weight of the A and B components.

According to a still further aspect of the present invention, the composition of the cover of a golf ball has a Shore D hardness of 30–55.

According to yet a further aspect of the present invention, the C component of a golf ball has a SP value of 7.0–10.0.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

The present invention is directed to a golf ball including a core and a cover surrounding the core.

In the present invention, the ionomer resin employed as the basic resin of the cover is, for example, a binary copolymer of α-olefin and α, β-unsaturated carboxylic acid having 3–8 carbon atoms, obtained by neutralizing at least a portion of the carboxyl group thereof with metallic ions. Alternatively, a ternary copolymer of α-olefin, α, β-unsaturated carboxylic acid having 3–8 carbon atoms, and α, β-unsaturated carboxylic acid ester having 2–22 carbon atoms, obtained by neutralizing at least a portion of the carboxyl group thereof with metallic ions can be employed. As to the composition ratio, 80–90% by weight of α-olefin and 10–20% by weight of α, β-unsaturated carboxylic acid are preferable when the base polymer of the ionomer resin is a binary copolymer of α-olefin and α, β-unsaturated carboxylic acid having 3–8 carbon atoms. When the base polymer is a ternary copolymer of α-olefin, α, β-unsaturated carboxylic acid having 3–8 carbon atoms and α, β-unsaturated carboxylic acid ester having 2–22 carbon atoms, 70–85% by weight of α-olefin, 5–30% by weight, particularly 12–20% by weight of α, β-unsaturated carboxylic acid, and 10–25% by weight of α, β-unsaturated carboxylic acid ester are preferable. It is also preferable that the melt index (MI) of these ionomer resins is 0.1–20, particularly 0.5–15. The impact resilience can be improved by setting the containing amount of carboxylic acid or carboxylic acid ester within the aforementioned range.

As the α-olefin, ethylene, propylene, 1-butene, 1-pentene, for example, are employed, wherein ethylene is particularly preferable. As the α, β-unsaturated carboxylic acid having 3–8 carbon atoms, acrylic acid, methacrylic acid, fumaric acid, maleic acid, crotonic acid, for example, are employed, wherein acrylic acid and methacrylic acid are particularly preferable. As the unsaturated carboxylic acid ester, methyl, ethyl, propyl, n-butyl, isobutyl ester or the like of acrylic acid, methacrylic acid, fumaric acid, maleic acid or the like, for example, are employed, wherein acrylic acid ester and methacrylic acid ester are particularly preferable. As the metallic ion neutralizing at least a portion of the carboxyl group in the foregoing copolymer of α-olefin and α, β-unsaturated carboxylic acid or the foregoing ternary copolymer of α-olefin, α, β-unsaturated carboxylic acid and α, β-unsaturated carboxylic acid ester, sodium ion, lithium ion, zinc ion, magnesium ion, potassium ion, for example, can be enumerated. When the ionomer resin has at least a portion of the carboxyl group in the copolymer of ethylene and acrylic acid or methacrylic acid neutralized with metallic ions, the highly rigid and high flow type having a melt index of 3–7 and a flexural modulus of 200–400 MPa is preferable.

Specific trade names of the ionomer resin are enumerated in the following. Hi-milan 1555 (Na), Hi-milan 1557 (Zn), Hi-milan 1605 (Na), Hi-milan 1706 (Zn), Hi-milan 1707 (Na), Hi-milan AM7318 (Na), Hi-milan 1706 (Zn), Hi-milan AM7315 (Zn), Hi-milan AM7317 (Zn), Hi-milan AM7311 (Mg), and Hi-milan MK7320 (K) sold by Mitsui-DuPont Polychemical Co., Ltd. are available as the binary copolymer ionomer resin. As the ternary copolymer ionomer resin, Hi-milan 1856 (Na), Hi-milan 1855 (Zn), and Hi-milan AM7316 (Zn) are available from Mitsui-DuPont Polychemical Co., Ltd. As ionomer resins sold by DuPont Co., Surlyn 8940 (Na), Surlyn 8945 (Na), Surlyn 9910 (Zn), Surlyn 9945 (Zn), Surlyn 7930 (Li), and Surlyn 7940 (Li) are available. As the ternary copolymer type ionomer resin, Surlyn AD8265 (Na) and Surlyn AD8269 (Na) are available from DuPont Co.

As ionomer resins available from Exxon Chemical Japan Ltd., Iotek 7010 (Zn), Iotek 8000 (Na) and the like are available. Na, Zn, K, Li, Mg and the like in the above parenthesis following respective trade names of the ionomer resin indicate the metal type of these neutral metallic ions. In the present invention, the ionomer resin employed in the basic resin of the cover may have at least two of those enumerated above mixed. Alternatively, at least two types of the ionomer resin neutralized with monovalent metallic ions enumerated above and ionomer resin neutralized with divalent metallic ions can be mixed to be used.

As the material of the cover of the present invention, at least one type of thermoplastic elastomer with a rubber segment in its polymer unit or a modified product thereof (B component) is used. Here, the thermoplastic elastomer with a rubber segment is a block copolymer including a conjugated diene compound such as a butadiene block or isoprene block. As the conjugated diene compound, one or at least two types can be selected from, for example, butadiene, isoprene, 1, 3-pentadiene, 2, 3-dimethyl-1, 3-butadiene. Particularly, butadiene, isoprene, and a combination thereof are preferable. As the component forming other block copolymers, one or at least two types can be selected from styrene, α-methyl styrene, vinyl toluene, p-3 butyl styrene, 1, 1-diphenyl ethylene, wherein styrene is particularly preferable.

As specific examples of block copolymers, a styrene-isoprene-butadiene-styrene block copolymer (SIBS structure), a styrene-butadiene-styrene block copolymer (SBS structure), a styrene-ethylene-butylene-styrene block copolymer (SEBS structure), a styrene-isoprene-styrene block copolymer (SIS structure), a styrene-ethylene-propylene-styrene block copolymer the (SEPS structure), a styrene-ethylene-ethylene-propylene-styrene block copolymer (SEEPS structure), and a modified product thereof can be enumerated.

The containing amount of styrene (or an alternative monomer) of the foregoing SIBS structure, SBS structure, SEBS structure, SIS structure, SEPS structure, and SEEPS structure is in the range of 10–50% by weight, particularly 15–45% by weight in the copolymer. If the containing amount thereof is less than 10% by weight, the cover will become so soft that the cut resistance is degraded. If the containing amount is greater than 50% by weight, the ionomer resin cannot be softened sufficiently to result in inferior shot feeling and controllability.

In the present invention, a modified product that is modified by a functional group selected from an epoxy group, hydroxy group, acid anhydride, and carboxyl group can be included as a part of the copolymer of the foregoing SIBS, SBS, SEBS, SIS, SEPS and SEEPS structure.

For example, the styrene-butadiene-styrene block copolymer (SBS structure) including a polybutadiene block with an epoxy group is a block copolymer having polystyrene at both terminals with an intermediate chain of polybutadiene containing the epoxy group, wherein a portion or all of the double bond of the polybutadiene portion is hydrogenated. The styrene-isoprene-styrene block copolymer having a polyisoprene block containing an epoxy group (SIS structure) is a block copolymer having polystyrene at both terminals with an intermediate chain of polyisoprene containing the epoxy group, wherein a portion or all of the double bond of the polyisoprene portion is hydrogenated.

The equivalence of the epoxy group in the block copolymer of the epoxidized SBS structure or SIS structure is preferably 200–3000. If the equivalence of the epoxy group is lower than 200, reaction between the epoxy group and the free carboxyl group in the ionomer resin is reduced to degrade the dispersion of the block copolymer of the epoxidized SBS or SIS structure in the ionomer resin. There is a possibility that the durability is degraded. If the equivalence of epoxy is larger than 3000, reaction between the epoxy group and the free carboxyl group in the ionomer resin becomes excessive to degrade the flowability. There is a possibility that ball-molding becomes difficult.

Similarly, the hydroxy group, acid anhydride, and carboxyl group is introduced at the intermediate portion or terminal of the chain of the foregoing block copolymer.

As products of the block copolymer of the epoxidized SBS or SIS structure available on the market, the styrene-butadiene-styrene block copolymer including a polybutadiene block containing an epoxy group (SBS structure) sold under the trade name of Epofriend A1010 and ESBS from Daicel Chemical Industries Ltd., and the styrene-butadiene-styrene block copolymer has a hydrogenated portion of a polybutadiene block including an epoxy group sold under the trade name of ESBS AT018 and ESBS AT019 from Daicel Chemical Industries Ltd. can be enumerated. All of these products are suitable in the present invention.

As the block copolymer having the SBS or SIS structure modified by maleic anhydride at the polymer chain terminal, there is available on the market Krayton from Shell Chemical Corporation. It is preferable that maleic anhydride is included 0.1–5.0% by weight in the copolymer.

As the block copolymer having the SIBS or SEPS structure with a hydroxy group added to one or both of the polymer chain terminals, there is available on the market HG-252 from Kuraray Co., Ltd.

By mixing the modified product having such a functional group with the ionomer resin, the cover material can be softened while maintaining the impact resilience performance by the reaction or interaction of the aforementioned functional group with the carboxyl group of the ionomer resin. Here, the mixed ratio of the ionomer resin (A component) to the B component (A component/B component) is in the range of 0.25–4.0, preferably 0.4–2.4.

In the present invention, the desired cover characteristics can be obtained by heating and mixing the foregoing ionomer resin with the thermoplastic elastomer of the SBS or SIS structure or a modified product thereof. The heat-mixing process is carried out at, for example, 150–260° C. using an internal mixer such as the general two-shaft kneading type extruder, Banbury, kneader, or the like.

The resin (C component) that is to be dissolved with the thermoplastic elastomer with a rubber segment or a modified product thereof used in the cover of the present invention preferably has a solubility parameter (hereinafter SP) value of 7.0–10.0. This 7.0–10.0 SP value of the C component is preferable in order to have solubility with the B component that has the SP value of 7.0–10.0. The SP value of the C component is further preferably 7.5–9.5, more preferably 8.0–9.0, and particularly preferably 8.2–8.6. The value of the difference between the SP value of the B component (SPb) and the SP value of the C component (SPc), i.e. "SPb-SPc" is –3 to +3, preferably –1.5 to +1.5, particularly –1.0 to +1.0. In the case two or more types are used for the B component or C component, the average value of the SP values of those two or more components (average in weight) is to satisfy the above definitions. Further preferably, the SP values of all the components and the relationship of "SPb-SPc" should satisfy the above definitions. As the resin that can be used for the C component is a tackifier. For example, coumarone-indene based resin, terpene based resin, rosin derivative, phenol-formaldehyde based resin, alkyl phenol based resin, petroleum based resin, xylene-formaldehyde based resin, oligomer of polybutene, liquid rubber such as liquid polyisoprene and the like can be used. Particularly, terpene resin and rosin ester based resin are preferably applicable.

The foregoing terpene resin is a polymer of terpene monomer or a copolymer of terpene monomer with the second comonomer, which includes the terpene resin whose basic structure is shown by the following general formula (1), styrene based terpene resin whose basic structure is shown by the following general formula (2), phenol modified terpene resin whose basic structure is shown by the following general formula (3), and hydrogenated terpene resin thereof Formula (1)

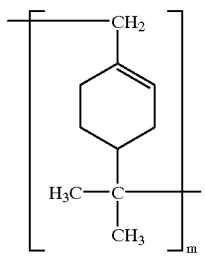

Formula (2)

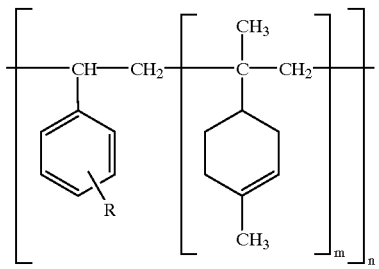

Formula (3)

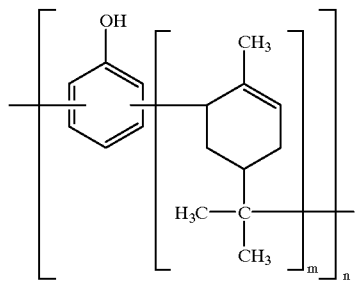

In the above formulas of (1)–(3), m and n are integers.

Specific trade names of such resins are set forth in the following. As the coumarone resin, Process Resin A81, Process Resin AC5, and Process Resin TX from Kobe Oil Chemical Industry Co., Ltd., Coumarone CL from Ouchishinko Chemical Industries Ltd., and coumarone resin NG4 from Nippon Steel Chemical Industries Ltd. are available. As the terpene-phenol resin, Tackirol 101, Tackirol 160, Tackirol EP20, and Tackirol EP30 from Sumitomo Chemical Co., Ltd., and Sumilight resin PR19900 from Sumitomo Dulez Co., Ltd. are available.

As the petroleum based resin, hydrogenated terpene resin Clearon P105 from Yasuhara Chemical Co., Ltd., Arkon P90 and Ester gum H from Arakawa Chemical Industries Ltd., Petroresin #80 and Hilets G100X from Mitsui Petrochemical Industries Ltd. are available.

As the rosin derivative, Nikanol A70 from Mitsubishi Gas Chemical Co., Inc., Lignol R70 from Libnite, and rosin ester resin from Arakawa Chemical Industries Ltd. are available.

These C components are dissolved uniformly with the B component mixed in the basic resin of the cover to provide appropriate adherence to the cover. Accordingly, the effect of adherence of the golf ball with respect to the club face when hit is improved to increase the wet spin maintenance. If the amount of the C component is increased to result in a blended amount equal to that of the B component, the wet spin improvement will be degraded. Although it may be expected that the mixture of the C component causes the rubber component of the B component to be softened to improve the wet spin rate, an amount of the C component greater than the ratio to the B component will result in extra C component to be mixed, whereby the effect of improving the wet spin will become lower than the case where an appropriate amount is mixed.

In the present invention, the mixed ratio of the thermoplastic elastomer with a rubber segment or a modified product thereof (B component) to the C component (C component/B component) is in the range of 0.1–0.9, preferably in the range of 0.2–0.6. Particularly, by the blend of 5–30 parts by weight of the C component with respect to the total 100 parts by weight of the A and B components, the wet spin rate can be increased while maintaining the impact resilience performance.

The cover of the present invention has a Shore D hardness of 30–55, preferably 40–50, more preferably 45–50 measured with a slab specimen. If the Shore D hardness is less than 30, the ball will become too soft, so that the initial velocity of the ball will be low. If the hardness exceeds 50, the spin rate when shot using a short iron or the like will be reduced. Here, the Shore D hardness is measured according to ASTMD-2240–68 using a sheet sample of 4 mm in thickness.

The composition of the cover in the present invention can include, if necessary, in addition to the foregoing resin corresponding to the main component, a filler such as barium sulfate or a pigment such as titanium dioxide, and also other additives such as a dispersion, an antioxidant, an ultraviolet absorber, a photo-stabilizer, a fluorescent material or a fluorescent brightening agent, provided that the blended amount thereof is within the range that does not deteriorate the desired characteristics of the golf ball cover.

The core used in the present invention is the thread-wound core or the core for a solid ball such as the two-piece ball and three-piece ball, and is applicable to all thread-wound balls and solid balls. The solid ball core is formed of a crosslinking product of a rubber composition. For a rubber component of the rubber composition, butadiene rubber having a cis-1,4-structure is suitable as the base material. It is noted that, in addition to the butadiene rubber, natural rubber, styrene butadiene rubber, isoprene rubber, chloroprene rubber, butyl rubber, ethylene-propylene rubber, ethylene-propylene diene rubber, acrylonitrile rubber, and the like, for example, may be blended at a ratio of not more than 40 parts by weight per 100 parts by weight of the rubber component.

Examples of a crosslinking agent used in the rubber composition are metal salt of $\alpha$, $\beta$-ethylenic unsaturated carboxylic acid produced by reacting $\alpha$, $\beta$-ethylenic unsaturated carboxylic acid such as acrylic acid and methacrylic acid with metallic oxide such as zinc oxide during preparation of the rubber composition, metal salt of $\alpha$, $\beta$-ethylenic unsaturated carboxylic acid such as zinc acrylate and zinc methacrylate, polyfunctional monomer, N, N' phenyl bis maleimide, sulfur, and the like that are usually employed as the crosslinking agent. In particular, metal salt of $\alpha$, $\beta$-ethylenic unsaturated carboxylic acid, specifically zinc salt thereof is preferred. For example, when metal salt of $\alpha$, $\beta$-ethylenic unsaturated carboxylic acid is used, it is preferably blended at a ratio of 20 to 40 parts by weight per 100 parts by weight of the rubber component. When $\alpha$, $\beta$-ethylenic unsaturated carboxylic acid is reacted with metallic oxide during preparation of the rubber composition, preferably 15 to 30 parts by weight of $\alpha$, $\beta$-ethylenic unsaturated carboxylic acid and 15 to 35 parts by weight of metallic oxide such as zinc oxide per 100 parts by weight of the $\alpha$, $\beta$-ethylenic unsaturated carboxylic acid are blended.

As a filler used in the rubber composition, one or more types of inorganic powder such as barium sulfate, calcium carbonate, clay, and zinc oxide can be used. The blending amount of the filler is preferably in the range of 5 to 50 parts by weight per 100 parts by weight of the rubber component.

In addition, a softening agent, liquid rubber or the like may be blended appropriately in order to improve the workability and adjust the hardness. Furthermore, an antioxidant may be blended appropriately.

As a crosslinking initiator, organic peroxide such as dicumyl peroxide and 1, 1-bis (t-butyl peroxy) 3, 3, 5-trimethyl cyclohexane, for example, is used. The blended amount of the crosslinking initiator is preferably in the range of 0.1 to 5 parts by weight, particularly 0.3 to 3 parts by weight per 100 parts by weight of the rubber component.

In the present invention, the core can be formed of a unitary layer, or a composite layer differing in characteristics such as the specific gravity and hardness. In this case, the blend of the core is not limited to that described above.

The core is produced by mixing the above-described blend materials with a roll, kneader, Banbury and the like, and vulcanizing the mixed materials at 145° C. to 200° C., preferably 150° C. to 175° C., under pressure for 10 to 40 minutes using a mold. In order to improve the adhesion between the core and the cover, an adhesive may be applied to the surface of the resultant core or the surface may be made rough.

The diameter of the thread-wound core or solid core is designed in the range of 36.8–40.8 mm, preferably 37.6–40.2 mm. If the diameter is less than 36.8 mm, the cover layer will become so thick that the impact resilience is degraded. If the diameter exceeds 40.8 mm, the cover layer will become so thin that molding is rendered difficult.

The cover of the present invention can be formed by the well-known method. The cover composition is formed in advance into a hemispherical-shaped half shell. Two thereof enclose the core, followed by a molding process with pressure at 130–170° C. for 1–5 minutes. Alternatively, the cover composition can be injection-molded directly on the core to enclose the same. The cover has a thickness of 1.0–3.0 mm, preferably 1.3–2.6 mm, more preferably 1.6–2.4 mm. If the thickness thereof is smaller than 1.0 mm, there is a disadvantage that the cover will crack easily when hit repeatedly. If the thickness is greater than 3.0 mm, the shot feeling is deteriorated. Also, a plurality of dimples are formed as necessary on the surface during the cover molding process. For the purpose of improving the aesthetic appearance to raise the commercial value, the golf ball of the present invention is generally applied with paint and stamped with marking to be provided on the market.

The cover of the present invention can be formed of one layer or a plurality of layers.

The golf ball of the present invention is designed generally in the range of 42.67–43.00 mm in ball diameter and 45.00–45.93 g in ball weight.

EXAMPLE

The present invention will be described according to Examples 1–4 of the present invention and Comparative Examples 1–5

(1) Production of Inner Layer Core

The rubber compositions for a core of the blend shown in the following Table 1 were kneaded and subjected to heat-pressing in a mold for 142° C.×16 minutes and 168° C.×8 minutes to produce a core of 39 mm in diameter.

TABLE 1

| Blend | Parts by weight |
| --- | --- |
| Polybutadiene[X1] | 100 |
| Zinc acrylate | 34 |
| Zinc oxide | 16 |
| Antioxidant[X2] | 0.5 |
| Dicumyl peroxide[X3] | 1.1 |
| Sulfur compound[X4] | 0.5 |
| Deformation of solid core (mm) (With load of 10~130 Kg) | 2.8 |

[X1]Japan Synthetic Rubber Corporation BR-18
[X2]Yoshitomi Pharmaceutical Industries Ltd. Yoshinox425
[X3]Nippon Oil & Fats Co., Ltd. Percumyl D
[X4]Sumitomo Seika Chemicals Co., Ltd. Diphenyl disulfide (2) Preparation of Cover Composition The cover blend materials shown in the following Table 2 were mixed using a two-shaft kneading type extruder to obtain cover compositions in the form of pellets. The conditions of extrusion were as follows:

Screw diameter: 45 mm
Screw rotating speed: 200 rpm
Screw L/D: 35

The blended compound was heated to 200–260° C. at the position of the die in the extruder.

A hemispherical half shell was molded using the obtained cover composition. Two thereof were used to enclose the obtained foregoing core.

Thermal press formation was applied within the mold. Paint was applied on the surface to produce a golf ball having the diameter of 42.8 mm and weight of 45.4 g.

The cover hardness (Shore D hardness), the spin rate as the flight performance and the shot feeling were assessed for the obtained golf balls.

The results are shown in Table 2.

The physical properties of the ball were assessed according to the following manner.

(1) Flight Performance, Spin Rate

A sandwedge club was attached to the swing robot of True Temper Co. The golf ball was hit at the head speed of 21 m/second to obtain the spin rate, measured by using the sequential photographs of the shot golf ball with marks.

Measurements were carried out under the normal dry condition and under the wet condition in which the ball and the club face were wetted with moisture.

The spin maintenance is defined as the value of spin rate under wet condition/spin rate under dry condition ×100.

(2) Shot Feeling (Impact, Bounce)

The golf balls were actually shot by ten golfers using a wood type golf club (NEW BREED PRO MODEL #1) of Sumitomo Rubber Industries to obtain assessment of the impact and impact resilience feeling under the following determination criteria. The most frequent assessment was taken as the result.

(Impact)
○ favorable with little impact
Δ A normal
× bad with great impact (Impact resilience)
○ favorable with impact bounce-off feeling
Δ A normal
× bad with heavy shot feeling and no impact resilience feeling The observed results of the golf balls of Examples 1–4 and Comparative Examples 1–5 are shown in Table 2. It is appreciated that the golf balls of the present invention are superior than the golf balls of Comparative Examples in flight distance, spin maintenance, and shot feeling.

The golf balls of Comparative Examples 1 and 2 have the A and B components mixed in a ratio outside the range of the present invention and exhibit a low WET spin rate. As a result, the spin maintenance is lower.

The golf ball of Comparative Example 3 exhibits poor shot feeling of bounce off and low WET spin rate since the amount of the C component is too great. The spin maintenance is also low.

The golf ball of Comparative Example 4 cannot have the hardness lowered and exhibits low spin maintenance since the C component is not included.

The golf ball of Comparative Example 5 exhibits low spin maintenance since the blended amount of the C component is too great.

TABLE 2

| | | | Present Invention Example | | | | Comparative Example | | | | |
|---|---|---|---|---|---|---|---|---|---|---|---|
| | | | 1 | 2 | 3 | 4 | 1 | 2 | 3 | 4 | 5 |
| Blend | Ionomer resin | Surlyn 8945[X1] | 25 | | 25 | 25 | 45 | 5 | 25 | 21 | 30 |
| | A Component | Surlyn 9945[X2] | 25 | | 25 | 25 | 40 | 5 | 25 | 21 | 30 |
| | | Iotek 7010[X3] | | 25 | | | | | | | |
| | | Iotek 8000[X4] | | 25 | | | | | | | |
| | | Hi-milan 1855[X5] | | | | | | | | 16 | |
| | Thermoplastic elastomer | HG252[X6] | 35 | 35 | 35 | 50 | 15 | 70 | 35 | 29 | 30 |
| | Containing rubber segment B Component | Epofriend A1010[X7] | 15 | 15 | 15 | | | 20 | 15 | 13 | 10 |
| | C Component | Clearon P105[X8] | 20 | 20 | | 10 | 15 | 20 | 50 | — | 40 |
| | | Ester gum H[X9] | | | 20 | | | | | | |
| | Mixed ratio | A/B | 1.0 | 1.0 | 1.0 | 1.0 | 5.7 | 0.1 | 1.0 | 0.7 | 1.5 |
| | | C/B | 0.4 | 0.4 | 0.4 | 0.2 | 1.0 | 0.22 | 1.0 | — | 1.0 |
| | | C/(A + B) | 0.2 | 0.2 | 0.2 | 0.1 | 0.15 | 0.2 | 0.5 | — | 0.4 |
| | Titanium dioxide | | 2 | 2 | 2 | 2 | 2 | 2 | 2 | 2 | 2 |
| | Barium sulfate | | 2 | 2 | 2 | 2 | 2 | 2 | 2 | 2 | 2 |
| Physical property | Cover hardness (Shore D) | | 41 | 46 | 42 | 50 | 60 | 28 | 35 | 51 | 42 |
| | DRY Spin rate (rpm) | | 7290 | 7100 | 6900 | 6800 | 6200 | 7400 | 7200 | 7100 | 7300 |
| | WET Spin rate (rpm) | | 3800 | 3700 | 3380 | 3000 | 2000 | 2800 | 2500 | 2350 | 2850 |
| | Spin maintenance (%) | | 54 | 52 | 49 | 44 | 31 | 38 | 35 | 33 | 39 |
| | Shot feeling (impact) | | ○ | ○ | ○ | ○ | X | ○ | ○ | Δ | ○ |
| | Shot feeling (impact resilience) | | ○ | ○ | ○ | ○ | ○ | X | Δ | ○ | ○ |

[X1]: DuPont Co., Ltd., sodium ion neutral ethylene-methacrylic acid copolymer based ionomer resin, MI = 4.8
[X2]: DuPont Co., Ltd., zinc ion neutral ethylene-methacrylic acid copolymer based ionomer resin
[X3]: Exxon Chemical Japan Ltd., zinc ion neutral ethylene-acrylic acid copolymer based ionomer resin
[X4]: Exxon Chemical Japan Ltd., sodium ion neutral ethylene-acrylic acid copolymer based ionomer resin
[X5]: Mitsui-DuPont Polychemical Co., Ltd., zinc ion neutral ethylene-methacrylic acid-isobutyl acrylate ternary copolymer based ionomer resin
[X6]: Kuraray Co., Ltd., hydrogenated SIBS with hydroxy group added to the polymer chain terminal (SEEPS-OH), containing styrene 28 wt %, isoprene/butadiene weight ratio 55/45. solubility parameter (SP) value: 7.6
[X7]: Daicel Chemical Industries Ltd., epoxidized SBS, epoxy equivalence 950–1050, butadiene/styrene weight ratio 60/40, SP value: 9.4
[X8]: Yasauhara Chemical Co., Ltd., hydrogenated terpene resin, solubility parameter (SP) value: 8.4
[X9]: Arakawa Chemical Industries Ltd., hydrogenated rosin ester resin, solubility parameter (SP) value: 8.5

According to the golf ball of the present invention, the cover material includes ionomer resin (A component), thermoplastic elastomer with a rubber segment or a modified product thereof (B component), and a resin soluble with the thermoplastic elastomer with a rubber segment or a modified product thereof (C component), all blended in a particular ratio. The golf ball provides favorable shot feeling, and easily comes to a halt with a high spin rate when hit by a short iron or the like. Furthermore, the ratio of the spin rate when in a wet condition to a dry condition, i.e., the spin maintenance, is improved.

Although the present invention has been described and illustrated in detail, it is clearly understood that the same is by way of illustration and example only and is not to be taken by way of limitation, the spirit and scope of the present invention being limited only by the terms of the appended claims:

What is claimed is:

1. A golf ball including a core and a cover surrounding said core, said cover constituted by a mixture of an ionomer resin (A component), a thermoplastic elastomer with a rubber segment or a modified product thereof (B component), and a terpene resin and/or rosin ester resin (C component) soluble with said thermoplastic elastomer with a rubber segment in its polymer unit or modified product thereof, said component B having a solubility parameter (SP) of 7.0 to 10.0 and said components C having a solubility parameter (SP) of 7.0 to 10.0 wherein the mixing ratio of said A component to said B component (A component/B component) is in a range of 0.25–4.0, and the mixing ratio of said C component to said B component (C component/B component) is in a range of 0.1–0.9.

2. The golf ball according to claim 1, wherein said thermoplastic elastomer with a rubber segment in its polymer unit or modified product thereof (B component) includes a styrene-isoprene-butadiene-styrene block copolymer (SIBS structure), a styrene-butadiene-styrene block copolymer (SBS structure), a styrene-isoprene-butadiene-styrene block copolymer (SIS structure) wherein said butadiene block or isoprene block may be modified by a functional group selected from a carboxyl group, epoxy group, hydroxy group, and acid anhydride.

3. The golf ball according to claim 1, wherein said C component has a blended amount of 5–30 parts by weight with respect to a total of 100 parts by weight of said A and B components.

4. The golf ball according to claim 1, wherein a composition of said cover has a Shore D hardness of 30–55.

5. A golf ball including a core and a cover surrounding said core, said cover constituted by a mixture of an ionomer resin (A component), a thermoplastic elastomer with a rubber segment or a modified product thereof (B component), and a resin (C component) soluble with said thermoplastic elastomer with a rubber segment in its polymer unit or modified product thereof, said component B having a solubility parameter (SP) of 7.0 to 10.0 and said components C having a solubility parameter (SP) of 7.0 to 10.0, with the difference between the solubility parameters (SP) of components B and C being −1.5 to +1.5, wherein the mixing ratio of said A component to said B component (A component/B component) is in a range of 0.25–4.0, and the mixing ratio of said C component to said B component (C component/B component) is in a range of 0.1–0.9.

* * * * *